United States Patent
Chol et al.

(10) Patent No.: US 8,204,016 B2
(45) Date of Patent: Jun. 19, 2012

(54) METHOD FOR SELECTING SERVING PNC BASED ON FER IN WIRELESS MESH NETWORK

(75) Inventors: Eun Chang Chol, Daejeon (KR); Jae-Doo Huh, Daejeon (KR); Moo Hoo Cho, Kyungsangbook-do (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 541 days.

(21) Appl. No.: 12/517,524

(22) PCT Filed: Dec. 3, 2007

(86) PCT No.: PCT/KR2007/006185
§ 371 (c)(1),
(2), (4) Date: Jun. 3, 2009

(87) PCT Pub. No.: WO2008/069516
PCT Pub. Date: Jun. 12, 2008

(65) Prior Publication Data
US 2010/0067508 A1    Mar. 18, 2010

(30) Foreign Application Priority Data

Dec. 5, 2006  (KR) .................. 10-2006-0122151
Jul. 6, 2007  (KR) .................. 10-2007-0067818

(51) Int. Cl.
*H04W 4/00* (2009.01)
(52) U.S. Cl. ...................... 370/329; 370/470
(58) Field of Classification Search .................. 370/338, 370/252, 470, 328, 329, 332, 333
See application file for complete search history.

(56) References Cited

U.S. PATENT DOCUMENTS

| 6,026,297 A | 2/2000 | Haartsen |
| 6,148,207 A | 11/2000 | Baum et al. |
| 7,058,021 B2 | 6/2006 | Srikrishna et al. |

(Continued)

FOREIGN PATENT DOCUMENTS

EP    1 482 657 A2    12/2004

(Continued)

OTHER PUBLICATIONS

Jinwoo Han, et al., "Energy Efficient PNC selection procedure for HR-WPAN," Journal of Korea Computer Congress, 2005, vol. 32, No. 1.

(Continued)

*Primary Examiner* — Brian D Nguyen
(74) *Attorney, Agent, or Firm* — Staas & Halsey LLP

(57) ABSTRACT

Provided is a method for selecting a serving PNC at a wireless device in a wireless mesh network for data communication. In the method, an initial PNC is selected if data is generated to transmit. Then, an initial MAC frame size is decided and data communication is performed with the selected initial serving PNC. A PNC having a best channel state is reselected from PNCs in a same coverage as a serving PNC after selecting the initial serving PNC. A MAC frame size is decided for the reselected serving PNC and data communication with the reselected serving PNC is performed. The data communication is terminated if a FER of the reselected serving PNC is larger than a maximum allowable FER or if there is no data to transmit after the data communication is performed.

9 Claims, 12 Drawing Sheets

U.S. PATENT DOCUMENTS

| | | | |
|---|---|---|---|
| 2002/0003792 A1* | 1/2002 | Schmidl et al. | 370/343 |
| 2003/0063619 A1 | 4/2003 | Montano et al. | |
| 2005/0026569 A1 | 2/2005 | Lim et al. | |
| 2005/0078646 A1 | 4/2005 | Hong et al. | |
| 2005/0094569 A1* | 5/2005 | Schmidl et al. | 370/242 |
| 2005/0097409 A1 | 5/2005 | Shin et al. | |
| 2006/0023670 A1* | 2/2006 | Kim et al. | 370/337 |
| 2008/0170556 A1* | 7/2008 | Schmidl et al. | 370/343 |

FOREIGN PATENT DOCUMENTS

| | | |
|---|---|---|
| JP | 2002-368760 | 12/2002 |
| KR | 10-2003-0087746 | 11/2003 |
| KR | 10-2004-0092915 | 11/2004 |
| KR | 10-2005-0028737 | 3/2005 |
| KR | 10-2005-0041227 | 5/2005 |
| KR | 10-2005-0063612 | 6/2005 |
| KR | 20-0415521 | 4/2006 |
| KR | 10-2006-0067731 | 6/2006 |

OTHER PUBLICATIONS

HeoJu Jeong, et al., "Accessibility Information Element & a PNC Selection Method in the High Rate WPAN," Journal of Korean Information and Communications Society, '05-10, vol. 30, No. 10B.

Eun-Chang Choi, et al., "Frame-size Adaptive MAC Protocol in High-Rate Wireless Personal Area Networks," ETRI Journal, vol. 28, No. 5, Oct. 2008, pp. 660-663.

International Search Report for International Application PCT/KR2007/006185, mailed Mar. 17, 2008.

* cited by examiner

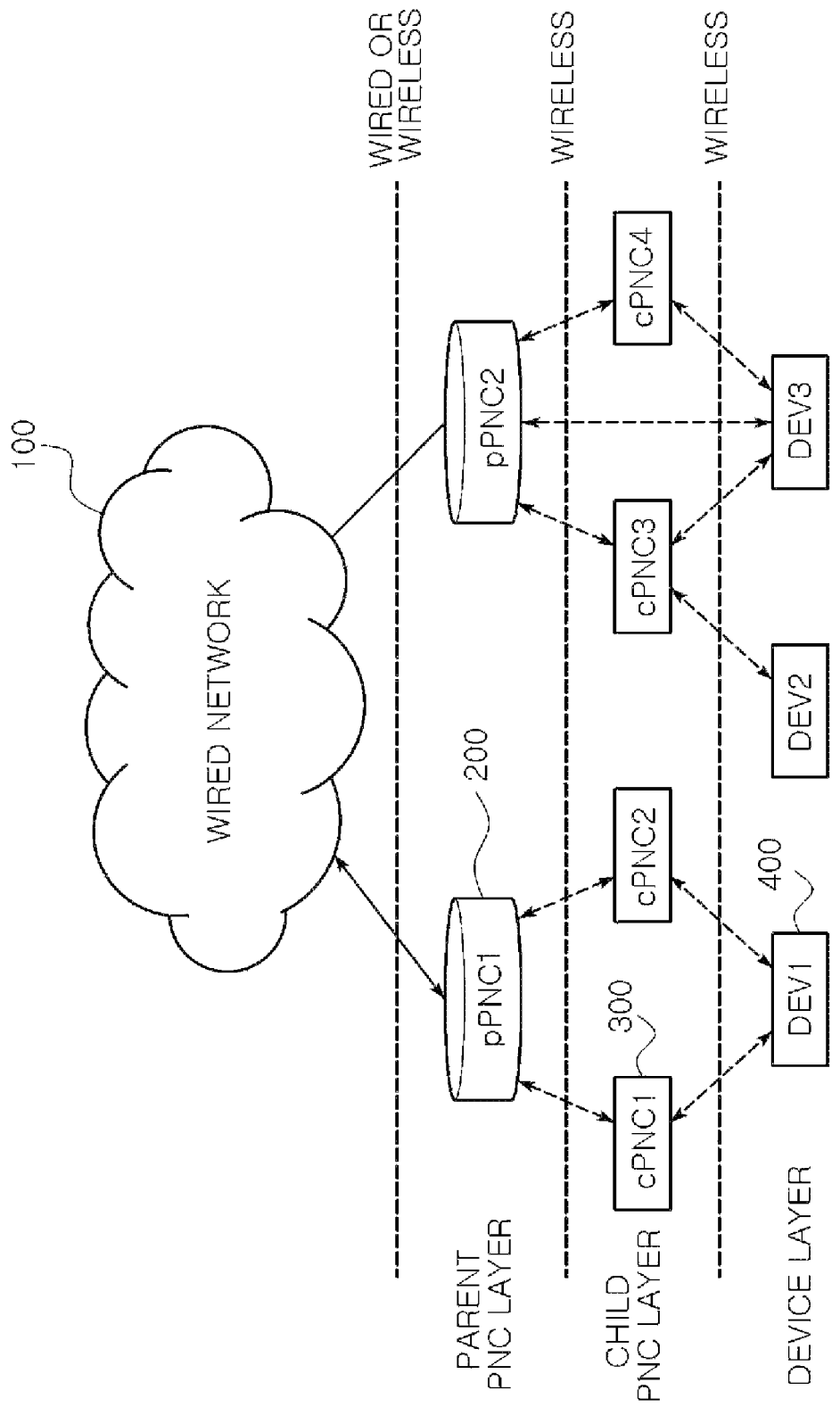
[Figure 1]

[Figure 2]
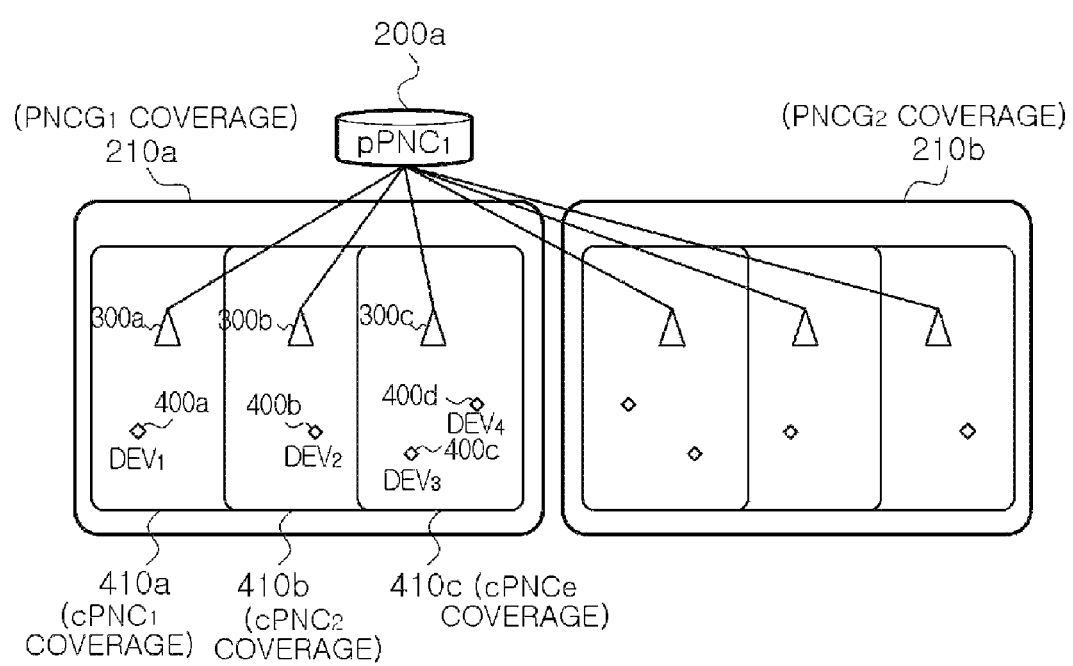

[Figure 3]
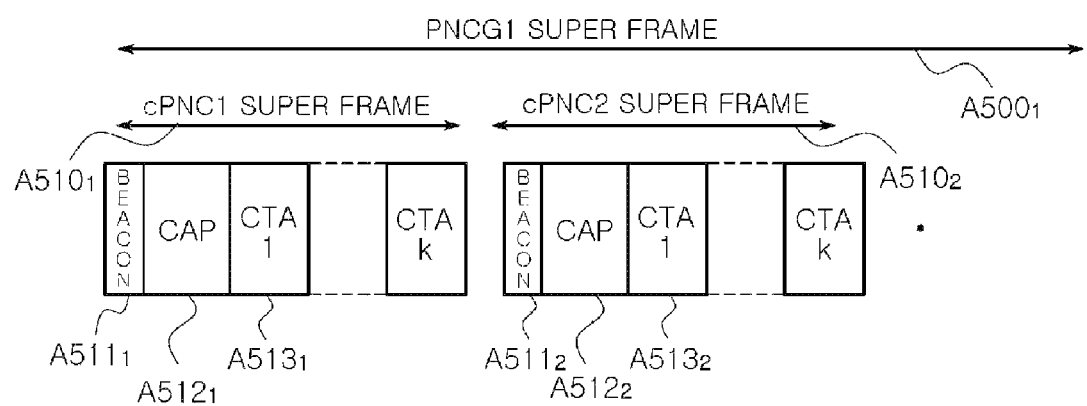

[Figure 4]
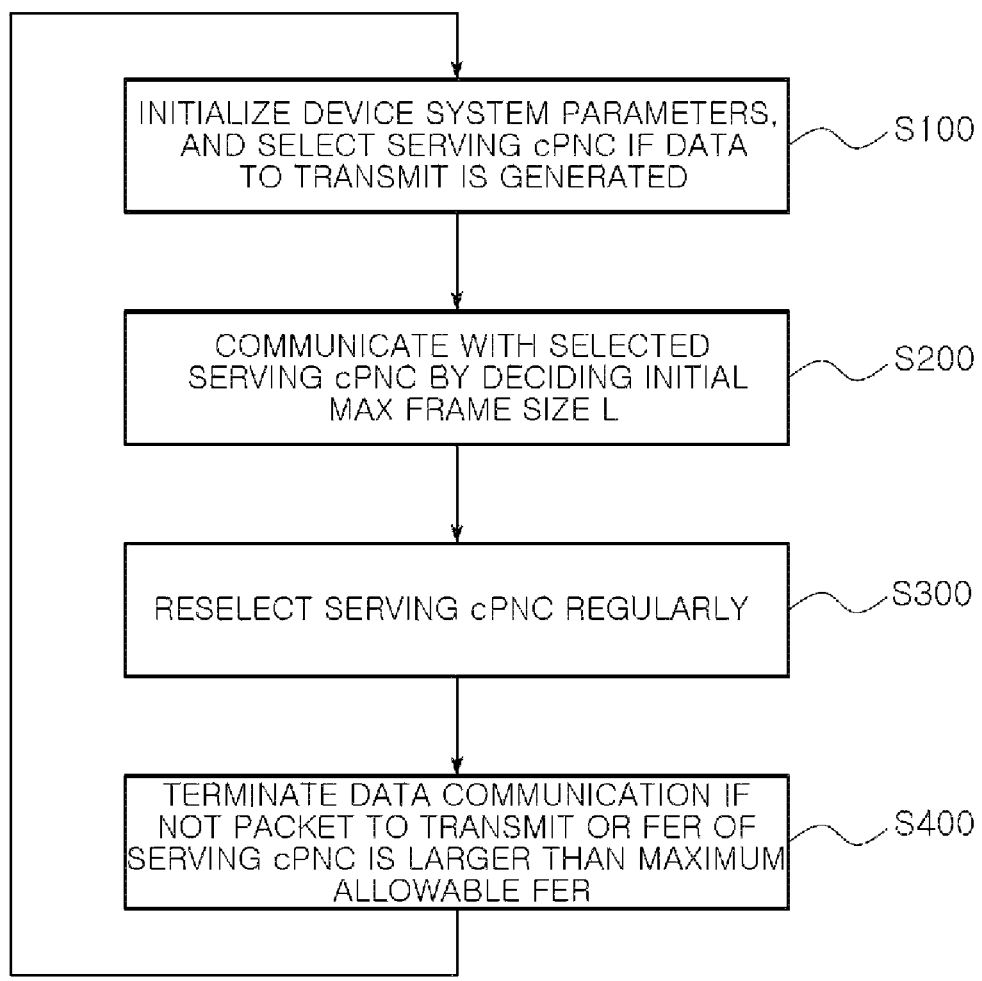

[Figure 5]
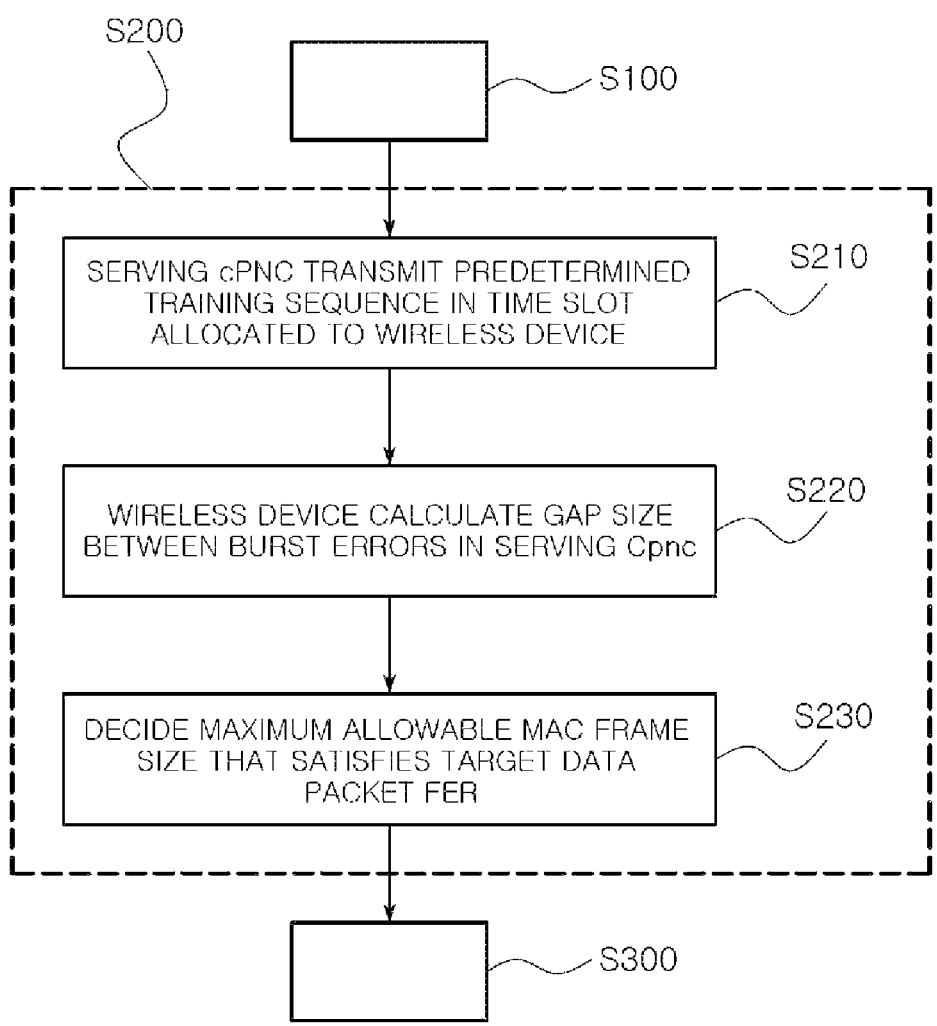

[Figure 6]
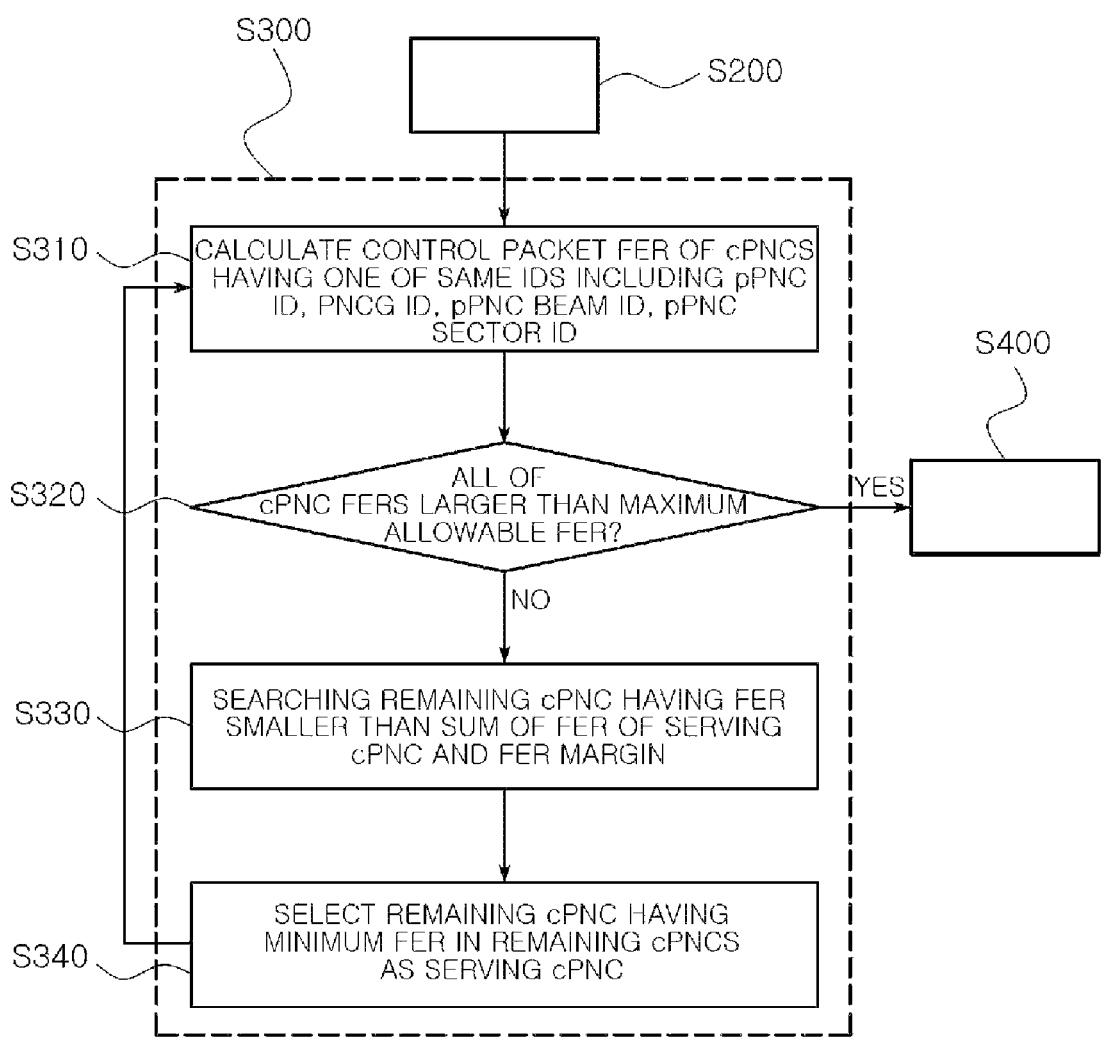

【Figure 7】
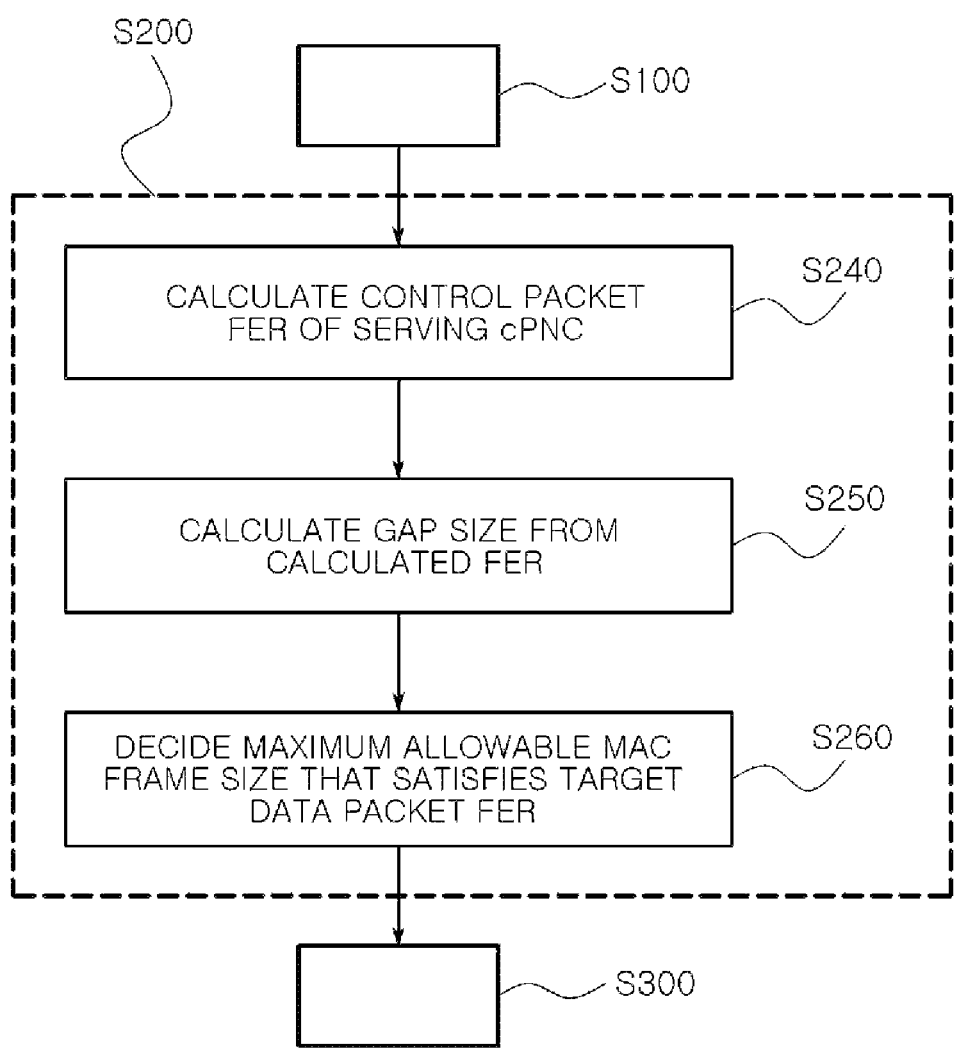

【Figure 8】
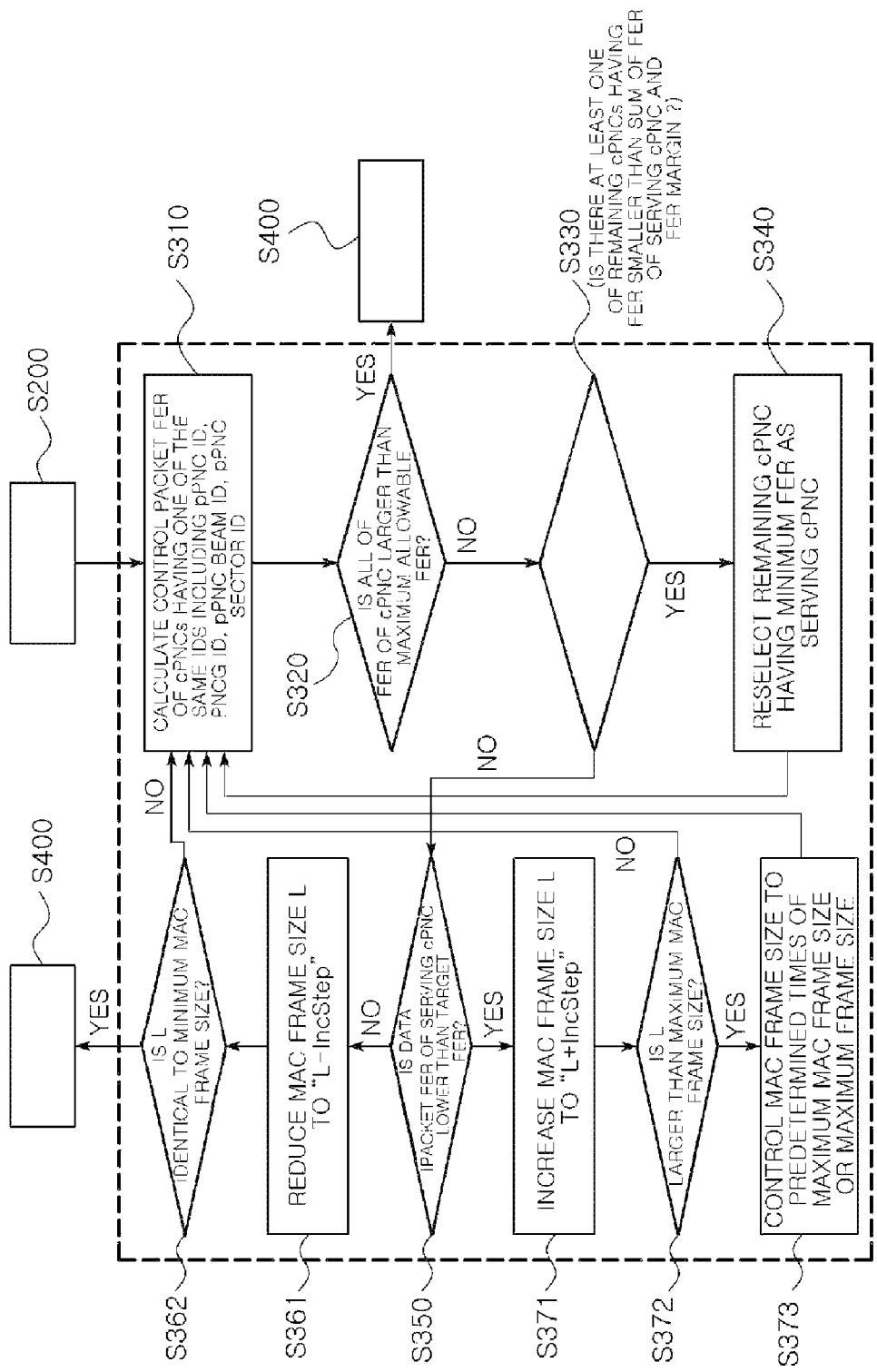

[Figure 9]
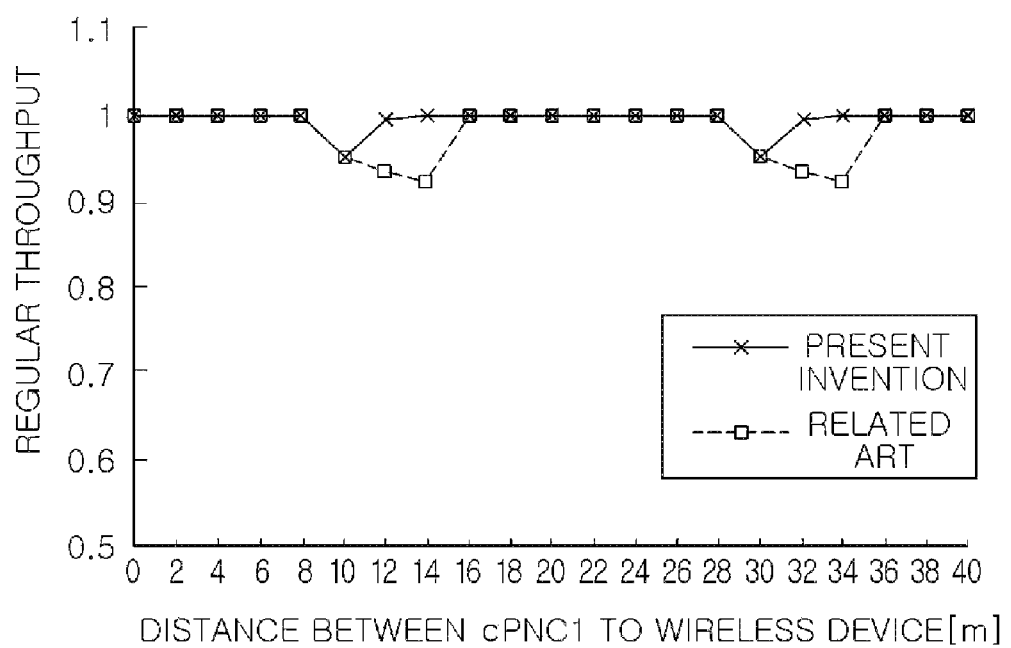

[Figure 10]
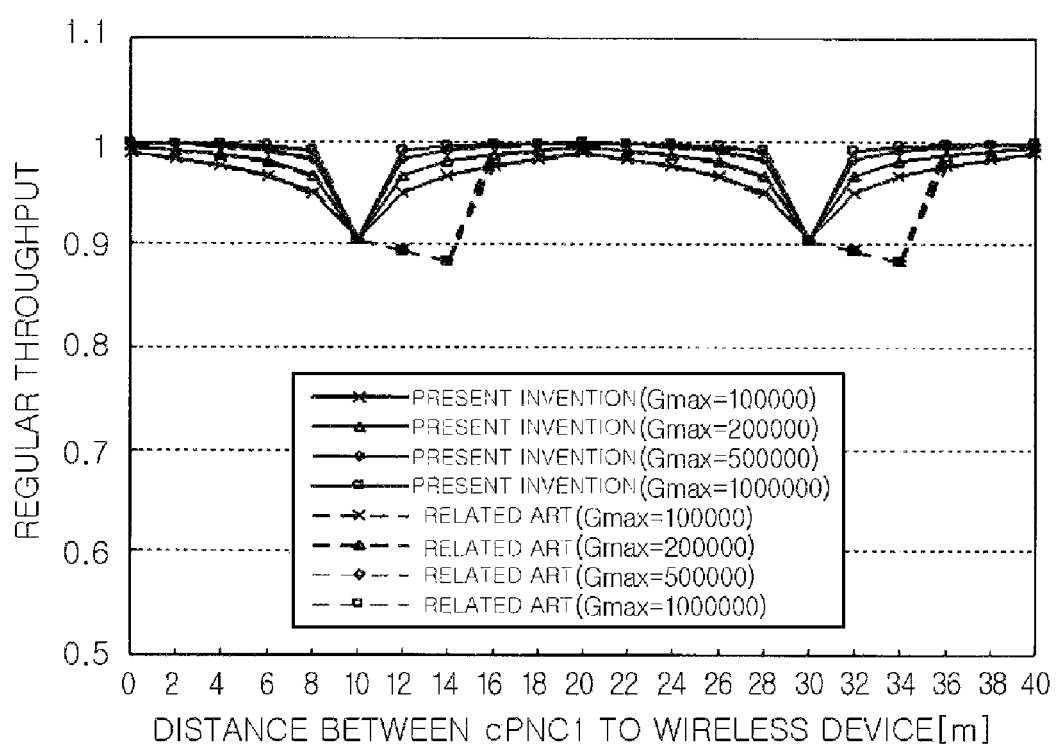

【Figure 11】
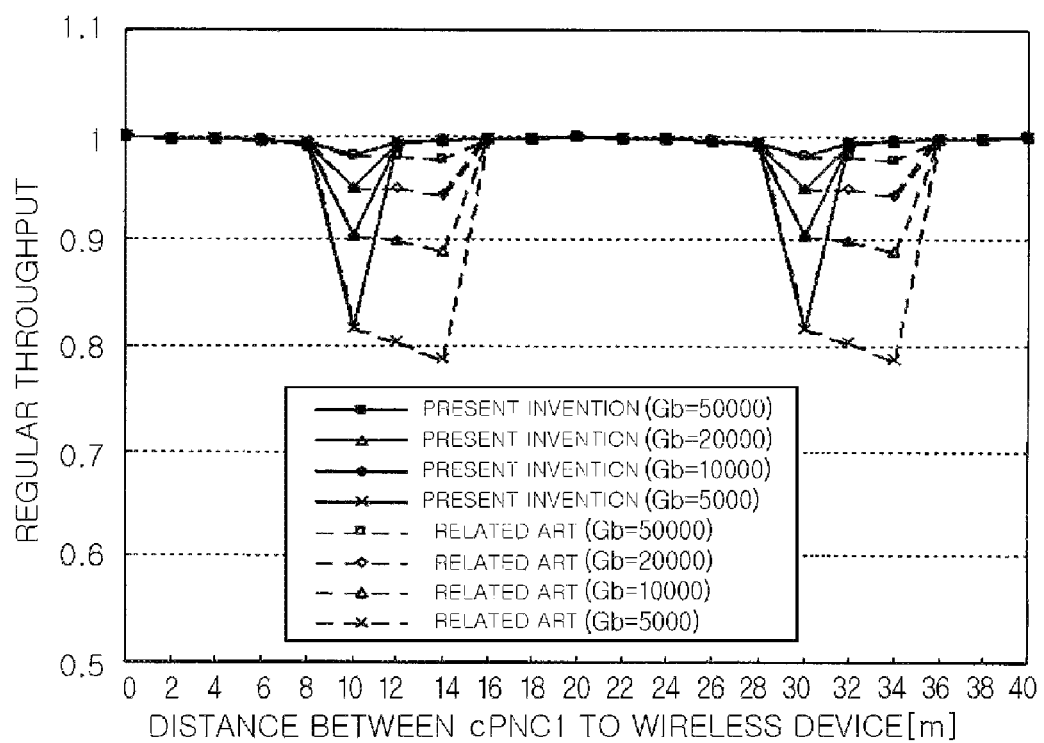

【Figure 12】
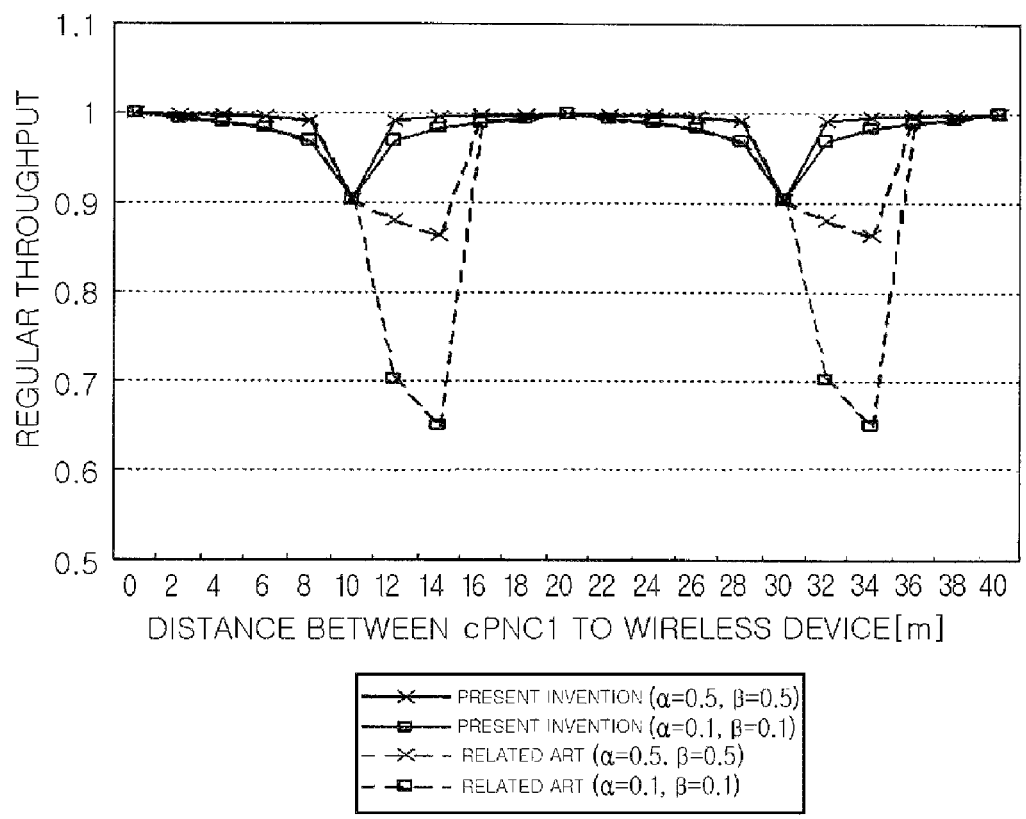

METHOD FOR SELECTING SERVING PNC BASED ON FER IN WIRELESS MESH NETWORK

CROSS REFERENCE TO RELATED APPLICATIONS

This application claims the benefit under 35 U.S.C. Section 371, of PCT International Application PCT/KR2007/006185, filed Dec. 3, 2007, which claimed priority to Korean Application 10-2006-0122151, filed Dec. 5, 2006, and Korean Application No. 10-2007-0067818, filed Jul. 6, 2007, the disclosures of all of which are hereby incorporated by reference.

TECHNICAL FIELD

The present disclosure relates to a method for selecting a serving piconet coordinator (PNC) at a wireless device in a wireless mesh network for data communication; more particularly, to a method for selecting a serving PNC based on a frame error rate (FER) in order to guarantee quality of service (QoS) and provide path diversity in a wireless device supporting IEEE 802.15.3 protocol (HR-WPAN).

The present disclosure was supported by the IT R&D program of MIC/IITA. [2006-P10-16, "A study of WPAN and home sensor network standardization"]

BACKGROUND ART

The quality of wireless links is deteriorated by factors that drop the performance of a time-variable channel, such as interference, flat-fading, and frequency selective fading. In order to dynamically adapt such channel variation, the IEEE 802.15.3 standard for HR-WPAN supports five different data transfer speeds. Therefore, a communication system may effectively perform data communication by properly selecting one of the data transfer speeds or deciding a MAC frame size according to a channel state.

Wireless mesh networks (WMN) were introduced as a critical technology for next generation wireless networking. Since the WMNs are dynamically self-systemized and self-configured, each of nodes automatically establishes an ad-hoc network and sustains mesh connection. The IEEE 802.15.5 task group has been studied a framework for wireless mesh topologies which are schedulable, stable and sharable with PAN devices.

In order to implement an effective communication system, a wireless device has to select the optimal piconet coordinator (PNC) according to a channel state. However, there were not many studies progressed for developing a method for selecting a PNC for improving throughput in a wireless mesh network.

High speed mesh architectures were introduced for providing path diversity between a mesh router and mesh clients in wireless mesh network. For example, a method of selecting a routing path was introduced in U.S. Pat. No. 7,058,021 entitled "Selection of routing paths based upon routing packet success ratios of wireless routes within a wireless mesh network". In U.S. Pat. No. 7,058,021, a selection method was provided to select a routing path based on a routing packet success rate of wireless roots in a wireless mesh network, and the selection method includes a method for deciding an optimal root based on a path quality of roots for access nodes of the wireless mesh network. In more detail, a wireless root having the highest success rate is initially selected, and other wireless roots having success rates in a predetermine range of good success rates are selected. Also, path availability, consistency, and throughput are considered to search the optimal path in the WLAN environment.

Adaptive robust tree (ART) for LR-WPAN was described in IEEE 802.15.5 TG. The ART is based on meshed tree approach and focuses on meshed tree routing, multicasting, and key pre-distribution. Related to this, a method of selective packet delay (SPD) was introduced to improve the performance of high speed downlink sharing channel (HS-DSCH). The SPD method employed an N-channel stop and wait retransmission (SAW) scheme of high speed downlink packet access (HSDPA). The introduced SPD controls packet transmission according to a channel state. If the channel state is bad, the packet transmission is delayed and an assigned time slot is given to other users having the good channel state. Therefore, the average transmission delay can be reduced in burst error environment.

DISCLOSURE OF INVENTION

Technical Problem

Since a cell-coverage generally has about 10 m of radius in the HR-WPAN environment, many wireless paths may be present in a cell-coverage as candidates for selecting the optical path and the quality of paths varies according to the movement of a wireless device. However, there were no studies progressed for developing a method for reselecting an optical path according to a channel state.

Since the SPD method was introduced for a HS-DPA system having a channel quality indicator channel (CQICH), it is impossible to directly apply the SPD method to HR-WPAN without modifying the SPD method.

The advantages of the SPD method cannot be guaranteed if channel states are not accurately measured. Although the entire system throughput is improved, it is difficult to guarantee QoS required per each user due to user time slots given to other users.

In order to overcome such problems, an aspect of the present invention provides a method for selecting a serving PNC of a wireless device in a wireless mesh network and a wireless device using the same.

Technical Solution

According to an aspect of the present invention, there is provided a method for selecting a serving piconet coordinator (PNC) at a wireless device in a wireless mesh network. In the method, an initial PNC is selected if data is generated to transmit in a data transceiving preparation state. An initial MAC frame size is decided for transmitting/receiving a packet to/from the selected initial serving PNC, and data communication is performed with the selected initial serving PNC. Then, a PNC having a best channel state is reselected from PNCs in a same coverage as a serving PNC while the data communication. A MAC frame size is decided for transmitting/receiving a packet to/from the reselected serving PNC if the serving PNC is reselected and data communication is performed with the reselected serving PNC. Then, the data communication is terminated if a frame error rate (FER) of the reselected serving PNC is larger than a maximum allowable FER or if there is no data to transmit after the data communication is performed.

In the deciding of the initial MAC frame size, predetermined training sequences may be received from the selected initial serving PNC, and a gap size between burst errors of the initial serving PNC may be calculated using the received training sequences. Then, a maximum allowable MAC frame size that satisfies a target data packet FER may be calculated using the calculated gap size and the calculated maximum allowable MAC frame size may be decided as an initial MAC frame size.

In the deciding of the MAC frame size, a control packet FER of the reselected serving PNC may be calculated. A gap size of a serving PNC may be calculated using the calculated control packet FER. Then, a maximum allowable MAC frame size that satisfy a target data packet FER may be calculated using the calculated gap size and the maximum allowable MAC frame size may be decided as a MAC frame size for packet communication.

The gap size of the serving PNC and the maximum allowable MAC frame size may be calculated by using Equation:

$$FER(L) = \frac{\overline{B}+L-1}{\overline{B}+\overline{G}}(1-q)^{L/2-K+1-\overline{B}/2},$$

where L denotes a MAC frame size, L is in a range of $(4K-4+\overline{B}) \leq L \leq (\overline{G}+1)$, FER(L) denotes a frame error rate at a MAC frame size L, $-1/(\overline{G}-K+2)$, $\overline{G}$ is a mean gap size (MGS), K is a constraint length of a convolution coder, and B is a mean burst size.

In the reselecting of the PNC having the best channel state, control packet FERs of all remaining PNCs and a serving PNC may be calculated in a corresponding coverage, regularly. Then, it may be determined whether all of the calculated control packet FERs are larger than a maximum allowable FER. Also, it may be determined whether the remaining PNCs include at least one having a control packet FER lower than a sum of a control packet FER of the serving PNC and a FER margin or not if all of the calculated control packet FERs are not larger than the maximum allowable FER. Then, a remaining PNC having a lowest control packet FER is reselected if the remaining PNCs includes at least one having a control packet FER lower than a sum of a control packet FER of the serving PNC and a FER margin, and a current serving PNC may be sustained if the remaining PNCs do not include at least one having the control packet FER lower than the sum of a control packet FER of the serving PNC and the FER margin.

The remaining PNCs and the serving PNC, which calculate the control packet FER, may have an identical ID, the identical ID including at least one of a parent PNC ID (pPNC ID), a PNC group ID (PNCG ID), a parent PNC beam ID (pPNC beam ID), and a parent PNC sector ID (pPNC sector ID).

In the method, a FER variation may be reduced to prevent a ping-pong event among PNCs before reselecting a serving PNC if the remaining PNCs includes at least one having a control packet FER lower than a sum of a control packet FER of the serving PNC and a FER margin.

In the method, it may be determined whether a data packet FER of a currently-selected serving PNC is lower than a target data packet FER if the remaining PNCs do not include at least one having a control packet FER lower than a sum of a control packet FER of the serving PNC and a FER margin. If the data packet FER of a currently-selected serving PNC is not lower than a target data packet FER, a MAC frame size of a serving PNC may be reduced by a predetermined unit value. Then, it may be determined whether the reduced MAC frame size is smaller than a minimum MAC frame size or not. If the MAC frame size is smaller than the minimum frame size, the data communication may be terminated. If the MAC frame size is larger than the minimum frame size, the data communication may be continuously performed with the reduced MAC frame size. Then, if a data packet FER of a serving PNC is smaller than a target data packet FER, a MAC frame size of a serving PNC may increase by a unit value. It may be determined whether the increased MAC frame size is larger than a maximum MAX frame size or not. If the increased MAC frame size is smaller than a maximum MAX frame size, the data communication is continuously performed, or the data communication is continuously performed after increasing the MAX frame size by predetermined times of the maximum MAC frame size. If the increased MAC frame size is larger than a maximum MAX frame size, the MAC frame size may change to the maximum MAC frame size.

The details of one or more embodiments are set forth in the accompanying drawings and the description below. Other features will be apparent from the description and drawings, and from the claims.

Advantageous Effects

A method for selecting a serving PNC based on a frame error rate (FER) according to an embodiment of the present invention can guarantee quality of service (QoS) and provide path diversity in a wireless mesh network where wireless channel environment varies while data communication.

BRIEF DESCRIPTION OF THE DRAWINGS

FIG. 1 is a diagram illustrating a wireless mesh network.

FIG. 2 is a diagram illustrating a wireless mesh network according to an embodiment of the present invention.

FIG. 3 is a block diagram illustrating the super frame of a piconet coordinate (PNC) in a wireless mesh network according to an embodiment of the present invention.

FIG. 4 is a flowchart of a method for selecting cPNCs based on a frame error rate measured in a wireless mesh network according to an embodiment of the present invention.

FIG. 5 is a flowchart of a method for selecting a MAC frame size according to an embodiment of the present invention.

FIG. 6 is a flowchart of a method of reselecting a cPNC according to an embodiment of the present invention.

FIG. 7 is a flowchart illustrating a method for selecting a MAC frame size according to an embodiment of the present invention.

FIG. 8 is a flowchart of a method for reselecting cPNC according to another embodiment of the present invention.

FIG. 9 is a graph showing a regular throughput according to a distance between a cPNC and a device.

FIG. 10 is a graph illustrating a regular throughput according to a distance between cPNC and a device where Gmax size changes according to an embodiment of the present invention.

FIG. 11 is a graph illustrating a regular throughput according to a distance between cPNC and a device where Gb size changes according to an embodiment of the present invention.

FIG. 12 is a graph illustrating a regular throughput according to a distance between a cPNC and a device where a [a,b] value changes according to an embodiment of the present invention.

BEST MODE FOR CARRYING OUT THE INVENTION

Reference will now be made in detail to the embodiments of the present disclosure, examples of which are illustrated in the accompanying drawings. In order to clearly describe the present invention, the descriptions of well-known functions and elements are omitted. Like numeral references denote like element throughout the accompanying drawings.

FIG. 1 is a diagram illustrating a wireless mesh network where the present invention is applied to.

Referring to FIG. 1, the wireless mesh network includes a device layer having wireless devices 400 for communicating through a wireless link, a child piconet coordinator layer having a plurality of child piconet coordinators (cPNC) 300, and a parent piconet coordinator layer having a plurality of parent piconet coordinators (pPNC) 200. The pPNC 200 may be embodied as a wireless router, and the cPNC 300 may be embodied as a wireless hub.

One of piconets includes a pPNC, more than one of cPNCs, and wireless devices.

In a piconet, the pPNC 200 accesses the wired network 100 using a wired and a wireless communication method.

In order to transmit data through the wireless mesh network, the wireless device 400 must be connected to a pPNC 200 or a cPNC 300. In the present embodiment, the wireless devices 400 are connected to at least one of cPNCs.

The cPNC 300 obtains own PNC group (PNCG) ID information from an upper level of the pPNC 200 and regularly broadcasts the PNCG ID information to the wireless devices 400 in order to connect the cPNC to the wireless devices 400.

Although wireless devices can directly communicate with each other based on IEEE 802.15.3 standard, a wireless device (source device) transmitting data is considered as a wireless device communicating with a PNC in the present embodiment. Also, wireless devices and PNC participating in data transmission perform channel estimation.

The wireless mesh network employs a TDMA based super frame structure to support a multimedia service quality. The super frame is constituted of a beacon period, a contention access period (CAP), and more than one of channel time allocation periods (CTA). One of the CTA periods is used for commands, isochronous streaming, and asynchronous data access. One of wireless devices can transmit a plurality of frames to a target device in one CTA period without collision.

However, the channel quality may vary according to each frame even in the same CTA period. In the present embodiment, such channel variation is monitored and reflected to improve the performance thereof.

FIG. 2 is a diagram illustrating a wireless mesh network according to an embodiment of the present invention.

Referring to FIG. 2, a pPNC 200a includes m cPNCs 300a to 300c and n wireless devices 400a to 400c. In a piconet, the coverage of a pPNC 200a is divided into at least one of PNC group coverages. One PNCG coverage 201a includes more than one of cPNC coverages 410a to 410c The pPNC 200a senses the locations of the cPNCs 300a to 300c using a function of measuring the location thereof, for example, a global position system (GPS) or a location based service (LBS). The pPNC 200a also divides the cPNCs 300a to 300c to a plurality of PNC groups. The PNCG information changes if the cPNCs 300a to 300c move. Therefore, it is necessary to update PNCG information included in each of the cPNCs 300a to 300c. However, the PNCG information does not change while one wireless device communicates with a cPNC.

One of the wireless devices can communicate with j cPNCs, and one of the cPNCs can communicate with k devices. Herein, the cPNCs 300a to 300c locate along a road line. The connections between the pPNC 200a and the cPNCs 300a to 300c may have a channel state better than the connections between the cPNCs 300a to 300c and the wireless devices 400a to 400c.

The present invention relates to the connection between the wireless devices 400a to 400c and the cPNCs 300a to 300c regardless of the connection between the pPNC 300a and the cPNCs 300a to 300b having good channel state. Therefore, a PNC is referred as a cPNC connected to a wireless device in the description of the present invention.

FIG. 3 is a block diagram illustrating the super frame of a piconet coordinate (PNC) in a wireless mesh network according to an embodiment of the present invention.

Referring to FIG. 3, a PNCG1 super frame $A500_1$ allocated to one of the PNC groups includes a plurality of cPNC super frames $A510_1$ to $A510_2$ allocated to cPNCs included in a corresponding PNCG and has a plurality of CTA periods allocated to each of wireless devices connected to a corresponding cPNC.

If a wireless device is located in the coverage of the PNCG1, the wireless device can be connected to a plurality of cPNCs belonging to a corresponding PNCG1 and can request a different time slot for each cPNCs.

When a wireless device transmits data, the wireless device request time slots $A513_1$ to $A513_3$ to one of cPNCs belonging to a PNCG where the wireless device is located.

A cPNC related to such data transmission is referred as a serving cPNC and other cPNCs are referred as remaining cPNCs. As a wireless device moves, the quality of a path between a wireless device and the serving cPNC changes too. In the present embodiment, the quality of a data path is guaranteed by enabling the wireless device to reselect a serving cPNC based on a frame error rate (FER).

FIG. 4 is a flowchart of a method for selecting serving cPNC based on a frame error rate (FER) measured in a wireless mesh network according to an embodiment of the present invention.

Referring to FIG. 4, after turning on a wireless device that transmits data through a wireless mesh network, the wireless device initializes device system parameters and transits to a data transmission/reception preparing state. Then, if the wireless device has data to transmit, the wireless device selects a serving cPNC among adjacent connectable cPNCs in operation S100.

In operation S200, the wireless device decides an initial MAC frame size L for transmitting/receiving packets to/from the selected serving cPNC and transmits/receives the MAC frame size L of packets to/from the serving cPNC.

In operation S300, the wireless device monitors a channel state while performing data communication and reselects a cPNC having a good channel state as a serving cPNC.

In operation S400, the wireless device terminates the communication if the wireless device does not have packets to transmit or if the control packet FER of the selected serving cPNC is higher than the maximum allowable FER.

The method for selecting cPNCs based on a frame error rate (FER) according to the present embodiment will be described in more detail with reference to FIG. 5 through FIG. 8 in later. Hereinafter, a MAC frame error calculation method and a throughput calculation method, which are applied to the present invention, will be described.

A MAC frame error calculation method is necessary to decide a MAC frame size. A HR-WPAN system uses four different modulation schemes and communicates at 22, 33, 44, and 55 Mbps of data transfer rates while sustaining 11 mbaud/s of fixed symbol rate. In order to perform data communication at a further higher data transfer rate, an eight state variable rate Unger beck trellis coded modulation or a TCM is used. In these approaches, it is assumed that errors are independently generated between bit-streams in a frame. However, an error event is generated in a bursty type in a real communication system using a viterbi decode as a channel coding type. With reference to an article by R. L. Miller et al. entitled "On the error statistics of Viterbi decoding and the performance of concatenated codes" in September 1981, the jet propulsion laboratory at Pasadena Calif., a geometric distribution is used to model burst and gap probabilistic distribution. And, the model parameters are a mean burst size (MBS), a mean gap size (MGS), and a mean bit error (MBER). According to Miller's modeling, the probabilistic distribution of a burst size can be calculated by Equation 1.

$$P(B=l)=P(1-P)^{l-1}, l>0$$

In Equation 1, l denotes a size expressed in a bit-length, and $p=1/\overline{B}$.

$\overline{B}$ denotes MBS. FER is influenced by probabilistic distribution of a gap defined as P(G=g). The P(G=g) denotes a non-error consecutive bits g in the output of virterbi-decoded bit stream. The probabilistic distribution of a gap size in Equation 1 can be calculated by Equation 2.

$$P(G=g)=q(1-q)^{g-K+1}, \forall g \geq K-1$$

In Equation 2, $$q=1/(\overline{G}-K/2).$$

Herein, $\overline{G}$ is MGS, and K denotes a constraint length of a convolution coder.

If FER(L) is defined as a FER of a MAC frame having a size L, the FER(L) can be calculated by Equation 3.

$$FER(L) = \frac{\overline{B}+L-1}{\overline{B}+\overline{G}}(1-q)^{L/2-K+1-\overline{B}/2}$$

In Equation 3, L is in a range of $(4K-4+\overline{B}) \leq L \leq (\overline{G}+1)$.

Since many methods for calculating the FER have been introduced and well-known to those skilled in the art, the detail description thereof is omitted. In the present embodiment, the throughput of a wireless device is calculated using the Equations.

In order to calculate the throughput of a wireless device, it is necessary to calculate a gap size according to a distance between a cPNC and a wireless device. In general, a wireless channel state is degraded as the distance between a cPNC and a device increases. Herein, the gap size is also reduced. In the present embodiment, the gap size G(r) according to the distance between a cPNC and a wireless device is calculated by Equation 4.

$$G(r)=G_{max}-(r/R)^{\alpha}(G_{max}-G_b) \text{ if } r<R$$

$$G(r)=G_b-((r-R)/(2R)))^{\beta}(G_b-G_{min}) \text{ if } R<r<3R$$

$$G(r)=G_{min} \text{ if } r>3R$$

In Equation 4, $G_b$ denotes a boundary gap size at a cell edge, $G_{max}$ denotes a maximum $G_b$ size at a good channel state, and $G_{min}$ is a minimum gap size similar to a packet size. α and β are correction factors considered a radio wave environment. Since all of the parameters are dependable to the real channel environment, it is necessary to decide the parameters based on measurement.

In the present embodiment, it is assumed that the priorities of traffic types of all devices are the same. In this case, a channel type of each CTA is uniformly distributed to all devices. The channel type $T_{CTA}$ of each CTA in the super frame is calculated by Equation 5.

$$T_{CTA}=T_{CFP}/N_{DEV}$$

In Equation 5, TCFP denotes the duration time of a contention free period (CFP) in a super frame, and NDEV is the number of wireless devices in a piconet.

When a wireless device requests a time slot (CTA) to a cPNC, data speed for transmit a frame is informed to the cPNC. Accordingly, the cPNC calculates a duration time for transmit a frame. The throughput of each cPNC $TP_{CTA}$ is calculated by Equation 6.

$$TP_{CTA}(L)=(R \cdot T_{CTA}/T_{STT})(1-FER(L))/(1+\delta)$$

In Equation 6, R denotes a data speed, $T_{STT}$ denotes a time for transmitting a super frame, and L is a size of a payload in a MAC frame having a frame check sequence. δ is a ratio of overhead time for a frame time formed of a preamble, PHY/MAC headers, two short inter-frame spaces, and an ACK frame generated by transmitting one data frame.

Each of the operations in the method for selecting a serving PNC will be described in detail with reference FIG. 5 through FIG. 8 will be described.

FIG. 5 is a flowchart of a method for selecting a MAC frame size according to an embodiment of the present invention. That is, FIG. 5 shows the operation S200 in the method for selecting serving cPNC based on FER, which is shown in FIG. 4.

When a wireless device is turned on, the wireless device initializes system parameters and selects a serving cPNC. After selecting the serving cPNC, the selected serving cPNC transmits known training sequences to the wireless device in a time slot allocated to the serving cPNC for predetermined time duration in operation S210. The training sequences are previously known to the wireless device and the cPNC.

In operation S220, the wireless device calculates a gap size between burst errors in the selected serving cPNC using the received training sequences. In order to calculate the gap size, Equation 4 is used.

In operation S230, a maximum allowable MAC frame size that satisfies a target data packet FER is decided using Equation 3. That is, the maximum allowable MAC frame size is decided by satisfying the target data packet FER using a relational expression between the MAC frame size and a FER, which is Equation 3.

After the MAC frame size is decided, the wireless device communicates with the serving cPNC using the decided MAC frame size. While the wireless device is communicating with the serving cPNC, the wireless device reselects a serving cPNC at a regular interval in operation S300, thereby always sustaining a good channel state in a wireless environment where the channel state varies in time.

FIG. 6 is a flowchart of a method of reselecting a serving cPNC according to an embodiment of the present invention. That is, FIG. 6 shows the operation S300 in the method for selecting cPNCs based on FER, which is shown in FIG. 4.

Referring to FIG. 6, a wireless device regularly calculates a control packet FER of all cPNCs in the same coverage in order to reselect a serving cPNC having a good channel state in operation S310. The cPNCs in the same coverage have the same identifications such as a pPNC ID, a PNCG ID, a pPNC beam ID, and a pPNC sector ID.

Hereinafter, a method of identifying cPNCs in the same coverage will be described. As described above, the pPNC detects the locations of wireless devices and divides the cPNCs into a plurality of PNC groups (PNCG). For example, the pPNC includes a directional antenna or an array antenna. The cPNCs include a global positioning system (GPS) for informing the locations thereof of the pPNC, thereby enabling the pPNC to recognize the location of the cPNCs. One coverage area of a pPNC can be divided into beam areas or sector cell areas, and the coverage area can be recognized as one of the beam areas or the sector cell areas. According to the result of dividing and recognizing, a pPNC ID, a PNCG ID, a pPNC beam ID or a pPNC sector ID may be allocated. Therefore, the cPNCs in the same coverage can be identified by recognizing one of the cPNC' s IDs. In case of using the pPNC ID, it is not necessary to change the IEEE HR-WPAN standard in order to add the pPNC ID in to a control packet such as a beacon. However, in case of using the PNCG ID, the pPNC beam ID, or the pPNC sector ID, it is necessary to use the reserved field of the control packet or to extend control packets to have a field for these IDs.

After the control packet FERs of peripheral related cPNCs are calculated in operation S310, it is determined whether the entire calculated control packet FERs are larger than the maximum allowable FER or not in operation S320.

If the all FERs are larger than the maximum allowable FER in operation S320, the data communication is terminated in operation S400.

On the contrary, if the all FERs are not larger than the maximum allowable FER in operation S320, remaining cPNCs having a FER smaller than a sum of the FER of a serving cPNC and a FER margin are searched in operation S330.

Among the searched remaining cPNCs, a remaining cPNC having the minimum FER is selected as a serving cPNC in operation S340. Therefore, the wireless device continuously communicates through the reselected serving cPNC.

In the serving cPNC selecting method according to the present embodiment, the MAC frame size can be decided based on the other method in the operation S200.

FIG. 7 is a flowchart illustrating a method for selecting a MAC frame size according to an embodiment of the present invention.

Referring to FIG. 7, after a wireless device is turned on, the wireless device initializes device system parameters, transits to a preparing state to transmit/receive data, and selects a serving cPNC to transmit data in operation S100. Then, the wireless decides a MAC frame size through following operation.

That is, the wireless device calculates the control packet FER of the currently selected serving cPNC in operation S240. The control packet FER of the serving cPNC is calculated through Equation 3.

In operation S250, a gap size of a serving cPNC is calculated based on the calculated control packet FER.

In operation S260, a maximum allowable MAC frame size that satisfies a target data packet FER is decided using Equation 3.

In the serving PNC selecting method according to the present embodiment, a serving cPNC may be selected based on the other method in the operation S300.

FIG. 8 is a flowchart of a method for reselecting cPNC according to another embodiment of the present invention.

Referring to FIG. 8, a wireless device regularly calculates control packet FERs of remaining cPNCs in the same coverage in operation S310 in order to reselect a serving cPNC as described above. The remaining cPNCs in the same coverage have one of the same IDs such as a pPNC ID, a PNCG ID, a pPNC beam ID, and a pPNC sector ID.

In operation S320, it is determined whether the calculated control packet FERs of the entire remaining cPNCs are larger than the maximum allowable FER or not.

If the entire control packet FERs are larger the maximum allowable FER n operation S320, the data communication is terminated in operation S400.

However, if the entire control packet FERs are not larger than the maximum allowable FER in operation S320, remaining cPNCs having a FER smaller than a sum of the FER of a serving cPNC and a FER margin are searched in operation S330.

If one of the remaining cPNCs has a FER smaller than the sum of the FER of the service cPNC and the FER margin in operation S330, a FER variation between cPNCs using a FER margin is reduced to prevent ping-pong events among the cPNCs and a remaining cPNC having the minimum FER is selected as a serving cPNC in operation S340.

In contrary, if anyone of the remaining cPNCs does not have a FER smaller than the sum of the FER of a serving cPNC and a FER margin in operation S330, it is determined whether a data packet FER of a serving PNC is smaller than a target FER or not in operation S350.

If the data packet FER of the serving cPNC is not smaller than the target FER, the MAC frame size L of a serving cPNC is reduced to L-IncStep in operation S361. The IncStep is a unit value set to control the MAC frame size. The unit is a predetermined byte, for example, 8 bytes (64-bits).

After the MAC frame size is reduced in the operation S361, it is determined whether the controlled MAC frame size L is identical to the minimum MAC frame size, for example, 64-bits, in operation S362. If the controlled MAC frame size L is identical to the minimum MAC frame size, the data communication is terminated by performing the operation S400. If the controlled MAC frame size is larger than the minimum MAC frame size, the operation S310 is performed again while data communication is performed.

If the data packet FER of the serving cPNC is lower than the target FER in operation S350, the MAC frame size L of the serving cPNC increases to L+IncStep in operation S371.

Also, it is determined whether the MAC frame size L is equal to or larger than the maximum MAC frame size, for example, 8192-bits, in operation S372. If the MAC frame size L is smaller than the maximum MAC frame size, the operation S310 is performed again while the data communication is performed using the controlled MAC frame size. If the MAC frame size L is equal to or larger than the maximum MAC frame size, the MAC frame size L increases by predetermined times of the maximum MAC frame size, for example, more than two times, or the MAC frame size L sustains as it is in operation S373.

Then, data communication is performed with the controlled MAC frame size and the operations are performed repeatedly from the operation S300 while the data communication is performed.

In the present embodiment, a wireless device can selects a serving PCN using a WPAN application solution based on IEEE 802,25,3 standard. Therefore, wireless device according to the present embodiment has following advantages.

Hereinafter, the advantages of the wireless device according to the present embodiment will be described with reference to simulation results. Simulations are performed under assumptions and conditions as follows. It is assumed that all nodes are uniformly distributed in a coverage area of a piconet. It is also assumed that the coverage area has about 10 m of a radius and the coverage area is in the wireless area of the other piconet. In order to simplify, it is also assumed that all types of headers of packets are perfectly received. Since control and command frames are shorter than data frames, the failure of transmitting the control and command frames is not considered in the simulation. Also, parameters used in the simulation and analytic study are selected based on IEEE 802.15.3. Furthermore, the PNC selecting method according to the present embodiment will be compared with related methods in the throughputs thereof. Moreover, the PNC selection method according to the present embodiment and the conventional PNC selection method will be analyzed in various channel states in a view of throughput. In the serving PNC selecting method, a distance between a cPNC and a wireless device varies at [0–R] of the interval. Here, R denotes a cell radius of a PNC. A cPNC closest to a wireless device is selected among cPNCs having the same PNCG ID as a serving cPNC.

In the conventional serving PNC selecting method, the distance between a cPNC and a wireless device varies with [0-1.5 R] of interval. If a wireless device becomes far away from a serving cPNC, a call termination event may be generated due to a bad channel state, and the wireless device searches a new cPNC to connect to a new cPNC.

In the simulation, the probabilistic distribution of burst and gap is used instead of a fading channel. Burst events are sequentially generated by Equation 1, and gap events are sequentially generated by Equation 2. Frames are generated by a poisson process having δ=0.02 of an average value, which is an overhead rate of a maximum frame size for example, 8192-bits. The data transfer rate is normalized to 1 and the constraint length K of a virterbi decoder is 3. The other assumed parameters are as follows. Gmax is 1,000,000-bit long, Gb is 10,0000-bits long (Gb=10,000-bit), Gmin is 1,000-bits long (Gmin=1,000 bits), α and β are 0.5, and the frame size is 1024 bits.

The computer simulation is performed with 300 frames of a window size and 1024 bit of a MAC frame size. As the window size increases, the variation of the measured FER decreases. The window size formed of 300 frames (1024 bits per each frame) means t30 ms at a data transfer rate of 11 M-byte per second. It denotes a wireless channel state variable under a slow fading state like 10 Hz.

FIG. 9 is a graph showing a regular throughput according to a distance between a cPNC and a device according to an embodiment of the present invention. In FIG. 9, a first cPNC is located at 0 m, a second cPNC is located at 20 m, and a third cPNC is located at 40 m distance.

Referring to FIG. 9, although a wireless device according to the present embodiment has more throughput at the center of a coverage than that at the boundary of the coverage, the wireless device according to the present embodiment has overall throughput equal to or larger than that of a conventional wireless device in entire coverage.

FIG. 10 is a graph illustrating a regular throughput according to a distance between cPNC and a device where Gmax size changes according to an embodiment of the present invention.

The simulation is progressed with 100,000, 200,000, 500,000, and 1,000,000 bit-length of the Gmax sizes and the same other parameters. As shown in FIG. 10, the regular throughput does not change sensitively to the Gmax size in the conventional serving PNC selecting method. However, the regular throughput changes sensitively to the variation of the Gmax in the serving PNC selecting method according to the present embodiment. FIG. 11 is a graph illustrating a regular throughput according to a distance between cPNC and a device, where a GB size changes, according to an embodiment of the present invention.

The simulation is progressed with 100,000, 200,000, 500,000, and 1,000,000 bit-length of the Gmax sizes and the same other parameters. A wireless device has low throughput in a comparative long time in the conventional serving PNC selecting method. However, a wireless device has a low throughput in a comparative short time in the serving PNC selecting method according to the present embodiment.

FIG. 12 is a graph illustrating a regular throughput according to a distance between a cPNC and a device where a [a,b] value changes according to an embodiment of the present invention The simulation is progressed under the conditions that [0.5, 0.5] and [0.1, 0.1] are selected as [α, β] and the other parameters are the same. Referring to FIG. 12, the lower the α and β values are, the higher the regular throughputs becomes in the conventional serving PNC selecting method and the serving PNC selecting method according to the present embodiment. However, a wireless device has low throughput for comparative long time in the conventional serving PNC method, and a wireless device has low throughput only for a short time in the serving PNC method according to the present embodiment.

According to the comparison results shown in FIG. 9 to FIG. 12, the throughput is equal to or improved in the entire coverage area.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

In addition to variations and modifications in the component parts and/or arrangements, alternative uses will also be apparent to those skilled in the art.

The invention claimed is:

1. A method for selecting a serving piconet coordinator (PNC) at a wireless device in a wireless mesh network, comprising:
    selecting an initial serving PNC if data is generated to transmit in a data transceiving preparation state;
    deciding an initial MAC frame size for transmitting/receiving a packet to/from the selected initial serving PNC and performing data communication with the selected initial serving PNC;
    reselecting a PNC having a best channel state from PNCs in a same coverage as a serving PNC after selecting the initial serving PNC, regularly;
    deciding a MAC frame size for transmitting/receiving a packet to/from the reselected serving PNC and performing data communication with the reselected serving PNC if the serving PNC is reselected; and
    terminating the data communication if a frame error rate (FER) of the reselected serving PNC is larger than a maximum allowable FER or if there is no data to transmit after the data communication is performed.

2. The method of claim 1, wherein the deciding of the initial MAC frame size comprises:
    receiving predetermined training sequences from the selected initial serving PNC;
    calculating a gap size between burst errors of the initial serving PNC using the received training sequences; and
    calculating a maximum allowable MAC frame size that satisfies a target data packet FER using the calculated gap size and deciding the calculated maximum allowable MAC frame size as an initial MAC frame size.

3. The method of claim 2, wherein the maximum allowable MAC frame size is calculated by Equation:

$$FER(L) = \frac{\overline{B}+L-1}{\overline{B}+\overline{G}}(1-q)^{L/2-K+1-\overline{B}/2},$$

where L denotes a MAC frame size, L is in a range of $(4K-4+\overline{B}) \leq L \leq (\overline{G}+1)$, FER(L) denotes a frame error rate at a MAC frame size, $q=1/(\overline{G}-K+2)$, $\overline{G}$ is a mean gap size (MGS), K is a constraint length of a convolution coder, and $\overline{B}$ is a mean burst size.

4. The method of claim 2, wherein the gap size and the maximum allowable MAC frame size is calculated by Equation:

$$FER(L) = \frac{\overline{B}+L-1}{\overline{B}+\overline{G}}(1-q)^{L/2-K+1-\overline{B}/2}$$

, where L denotes a MAC frame size, L is in a range of $(4K-4+\overline{B}) \leq L \leq (\overline{G}+1)$, FER(L) denotes a frame error rate at a MAC frame size L, $q=1/(\overline{G}-K+2)$, $\overline{G}$ is a mean gap size (MGS), K is a constraint length of a convolution coder, and $\overline{B}$ is a mean burst size.

5. The method of claim 1, wherein the deciding of the MAC frame size comprises:
   calculating a control packet FER of the reselected serving PNC;
   calculating a gap size of the reselected serving PNC using the calculated control packet FER; and
   calculating a maximum allowable MAC frame size that satisfy a target data packet FER using the calculated gap size and deciding the maximum allowable MAC frame size as a MAC frame size for packet communication.

6. The method of claim 1, wherein the reselecting of the PNC having the best channel state comprises:
   calculating control packet FERs of all remaining PNCs and a serving PNC in a corresponding coverage, regularly;
   determining whether all of the calculated control packet FERs are larger than a maximum allowable FER;
   determining whether the remaining PNCs include at least one having a control packet FER lower than a sum of a control packet FER of the serving PNC and a FER margin or not if all of the calculated control packet FERs are not larger than the maximum allowable FER; and
   reselecting a remaining PNC having a lowest control packet FER as a serving PNC if the remaining PNCs includes at least one having a control packet FER lower than a sum of a control packet FER of the serving PNC and a FER margin, and sustaining a current serving PNC if the remaining PNCs do not include at least one having the control packet FER lower than the sum of a control packet FER of the serving PNC and the FER margin.

7. The method of claim 6, wherein the remaining PNCs and the serving PNC, which calculate the control packet FER, have an identical ID, the ID including at least one of a parent PNC ID (pPNC ID), a PNC group ID (PNCG ID), a parent PNC beam ID (pPNC beam ID), and a parent PNC sector ID (pPNC sector ID).

8. The method of claim 6, further comprising reducing a FER variation to prevent a ping-pong event among PNCs before reselecting a serving PNC if the remaining PNCs includes at least one having a control packet FER lower than a sum of a control packet FER of the serving PNC and a FER margin.

9. The method of claim 6, further comprising:
   determining whether a data packet FER of a currently-selected serving PNC is lower than a target data packet FER if the remaining PNCs do not include at least one having a control packet FER lower than a sum of a control packet FER of the serving PNC and a FER margin;
   reducing a MAC frame size of a serving PNC by a predetermined unit value if the data packet FER of a currently-selected serving PNC is not lower than a target data packet FER;
   determining whether the reduced MAC frame size is smaller than a minimum MAC frame size or not;
   terminating data communication if the reduced MAC frame size is smaller than the minimum frame size, and continuing data communication with the reduced MAC frame size if the MAC frame size is larger than the minimum frame size;
   increasing a MAC frame size of the serving PNC by a unit value if a data packet FER of a serving PNC is smaller than a target data packet FER;
   determining whether the increased MAC frame size is larger than a maximum MAX frame size or not; and
   continuing data communication if the increased MAC frame size is smaller than a maximum MAX frame size, or continuing data communication after increasing the MAX frame size by predetermined times of the maximum MAC frame size or changing the MAC frame size to the maximum MAC frame size if the increased MAC frame size is larger than a maximum MAX frame size.

* * * * *